Nov. 15, 1966  H. E. PINKERTON  3,285,182
DIAPHRAGM METERING PUMP
Filed Dec. 17, 1964  2 Sheets-Sheet 1
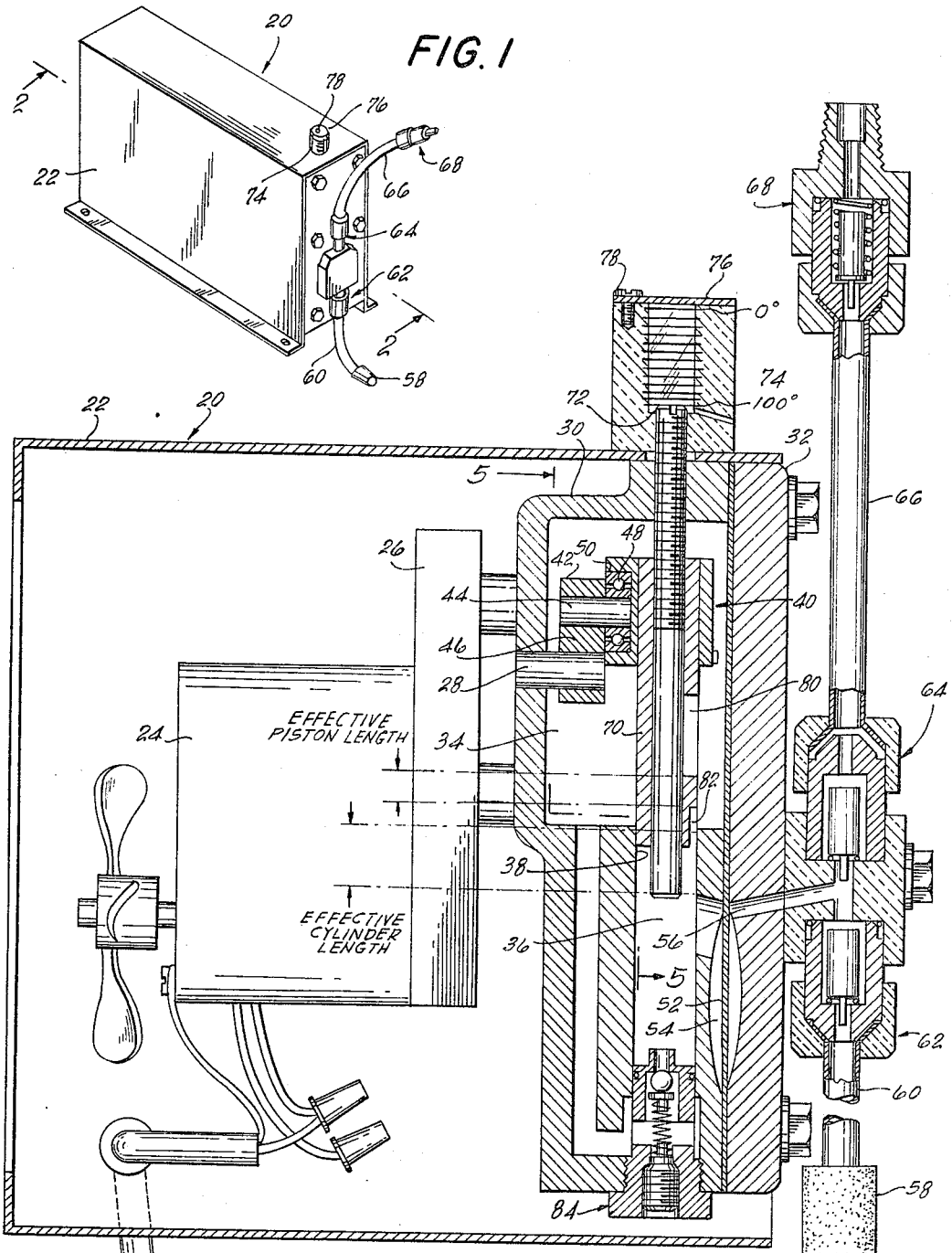
FIG.1
FIG.2
INVENTOR
HARRY E. PINKERTON
BY
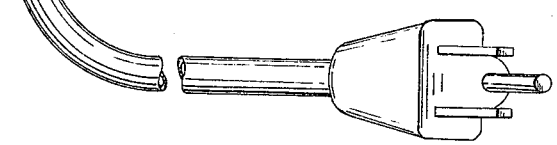
ATTORNEY Nov. 15, 1966    H. E. PINKERTON    3,285,182
DIAPHRAGM METERING PUMP
Filed Dec. 17, 1964    2 Sheets-Sheet 2

INVENTOR
HARRY E. PINKERTON
BY
Kane, Dalsimer & Kane
ATTORNEYS

United States Patent Office

3,285,182
Patented Nov. 15, 1966

3,285,182
DIAPHRAGM METERING PUMP
Harry E. Pinkerton, Mill Neck, N.Y.
(P.O. Box 387, Oyster Bay, Long Island, N.Y.)
Filed Dec. 17, 1964, Ser. No. 419,122
24 Claims. (Cl. 103—44)

This invention relates to improvements in diaphragm metering pumps and, more particularly, to an improved hydraulically actuated, positive displacement diaphragm metering pump.

Hydraulically actuated diaphragm metering pumps are widely used in the chemical, petrochemical, process, food and other industries to induce and control flows of liquid chemicals where precise flow control and fluid isolation are required. For example, such pumps would have application to the control of odorant or perfume in an automatic cosmetic manufacturing system, spice and flavoring in automated bakery operations, chlorine and fluorine addition in water systems, vitamin concentrate dosing in automatic animal feeding systems, reagent feeding in reactor systems, replenishers and activators in photochemical and electro-chemical systems as well as many others.

The degree of reproducible flow accuracy obtainable with hydraulically actuated diaphragm pumps as compared to mechanically actuated diaphragm pumps is high and, consequently, these pumps are therefore, most desirable for such precise fluid metering applications. However, the inherent complexity and hydraulics related problems of hydraulically actuated diaphragm pump systems cause their manufacturing and operating costs to be relatively high. Accordingly, their use to date has been somewhat limited.

It is, therefore, an object of this invention to simplify the structure of hydraulically actuated diaphragm pumps to reduce their manufacturing and operating costs while minimizing, if not partially eliminating, traditional hydraulic problems of such pumps in order that chemical systems employing this equipment may enjoy longer and more trouble-free life.

The hydraulic fluid balance of any closed hydraulic system typified by the prior art hydraulically actuated pumps, is basically unstable, drifting invariably toward the low pressure side of the system. Thus, systems requiring consistent balance must be provided with compensatory means by which balance can be continuously or periodically restored and maintained. If the pressure difference between the high and low pressure sides of a hydraulic system varies, the rate of drift also varies and the compensation means must, of course, also vary its rate of compensation. In hydraulically actuated diaphragm pumps, if uncompensated, the drift causes the diaphragm to gradually seek one extreme of extension or the other until either the diaphragm ruptures or pumping action stops. Designers of such pumps have developed many means of providing required compensation, for example, two parallel opposed hydraulic relief valves installed between the two sides of the system allow a compensating or balancing surge of hydraulic fluid to flow from high to low pressure zones when a predetermined maximum pressure differential is reached. Another known method of maintaining balance is through hydraulic actuation of the diaphragm in only one direction and positive mechanical actuation of the diaphragm in the other direction, thus eliminating drift and the need for balance compensation. The two valve system is inherently unreliable and troublesome while its counterpart hydramechanical system, subjects the diaphragm to mechanical stresses which seriously impair its life expectancy.

Another object of this invention therefore is to eliminate the redundant valve problem of the prior art, by removing the need for one of the two compensating valves and by utilizing the other in the dual function of high pressure safety bypass and hydraulic drift balancing.

A further classical problem of prior art hydraulically actuated diaphragm pumps is that attributable to vapor lock. In this connection, hydraulic fluids under constant agitation of pumping action are notably prone to collect and entrain small gas bubbles which act as energy absorbers and deter pumping action in many of the prior art hydraulically actuated diaphragm pumps. These small bubbles expand many fold when the pump is on its suction stroke and contract on the pressure stroke. This expansion and contraction represents an unpredictable and constantly varying portion of the total piston displacement for each pumping cycle. As these bubbles accumulate in the pumping chamber in a number of the hydraulically actuated diaphragm pumps, total pumped volume decreases steadily until at some level of concentration pumping stops altogether though piston reciprocation and total displacement remain unchanged. The usual means of contending with this air lock situation is through a manual bleeder cock or an intermittent automatic valve that periodically "bleeds off" the gases accumulated in the hydraulic pumping chamber.

It is, therefore, a further object of this invention to eliminate this vaporlock problem by automatically giving over a known portion of each pumping cycle to the gas purging function so that stroke to stroke pump accuracy of a high order is maintained.

Metering pump applications generally require that the metering pump flow rate be adjustable with a high degree of accuracy and preferably while the pump is in operation.tion. Classical adjustment practice with hydraulically actuated diaphragm pumps is through mechanical linkages that alter the length of the piston stroke without changing the stroke to stroke repetition rate. This practice causes a larger or smaller amuont of fluid to be transferred in the fixed time taken by one pump and suck cycle. Thus, fluid passages must be arranged to accommodate the maximum flow rate, though at all except maximum flow adjustment the fluid transfer rate is less than maximum. This unfortunate situation causes valves, poppets and diaphragm chambers on the secondary side of the traditional adjustment pump systems to operate inefficiently at low flow rate settings. In fact, at low settings this ineflicency is translated into unpredictably erratic flow rates because valves and poppets designed to be moved accurately by high velocity fluid flow will not always be moved accurately by slow velocity fluid flow. Several attempts have been made to rectify this situation without success.

Still another object of this invention is the provision of a novel system of adjusting fluid actuation time rather than fluid velocity so that the flowing velocity of fluids in the secondary system is constant at all pump settings and thus valves, poppets and chambers handle fluids under the optimum condition of design for greatest control latitude and dependably reproducible rate accuracy; the flow control of this invention is also easy to adjust and capable of being directly read; a scale associated with the flow control also serves as a flow rate indicator and, at the same time, doubles as a lock mechanism for the indicator so that its adjustment cannot be inadvertently altered.

A hydraulically actuated diaphragm pump, according to this invention, employs a piston pump for purposes of furnishing a pulsing hydraulic pressure to actuate the diaphragm in the pumping head. The hydraulic system is self-purging and cannot air lock. In this connection, the exterior of the plunger cooperates with the cylinder walls to bring the pump chamber into communication with the pump fluid reservoir which is at atmospheric pressure at the end of each half cycle. In this manner, cavitation bubbles and other oil entrained gases are extracted each stroke and the necessity for expensive and rather troublesome and complex bubble trap valves is eliminated. An internal hydraulic relief valve is incorporated for purposes of protecting the pump and system from overload.

Chemicals come into contact only with the pumping head, all components of which are corrosion resistant. In this way and due to the absence of any mechanical connections or push rods to cause distortion or stretch, the diaphragm in the pumping head experiences exceptionally long life.

The reciprocal piston is connected with the output of a motor through a Scotch yoke arrangement in accordance with a successful embodiment of this invention. Flow rate is adjusted at any time during operation by simply turning a control screw associated with the piston and having a portion thereof exposed on the top of the pump to facilitate this adjustment. A scale at this location indicates the amount of liquid being pumped as a percentage of the pump's maximum rated capacity. The flow indicator also prevents accidental change of the particular volume setting.

In a typical application of the present invention, a chemical solution is strained through a filter stone and enters the pumping head through a flexible tubing to the suction valve fitting on the intake side of the head. Inasmuch as the piston pump delivers a precise amount of oil to the back of the diaphragm in the pumping head, an equal amount of fluid is expelled from the chemical chamber. The fluid then travels through the discharge valve, the tubing, and the spring loaded anti-siphon valve into the waterline or product line, as the case may be.

Other objects and advantages will become apparent from the following detailed description which is to be taken in conjunction with the accompanying drawings illustrating a somewhat preferred embodiment of the present invention and in which:

FIG. 1 is a perspective view from the top front and one side;

FIG. 2 is a vertical longitudinal cross-section taken along line 2—2 of FIG. 1, with the piston at the top of its downstroke;

Figure 3:
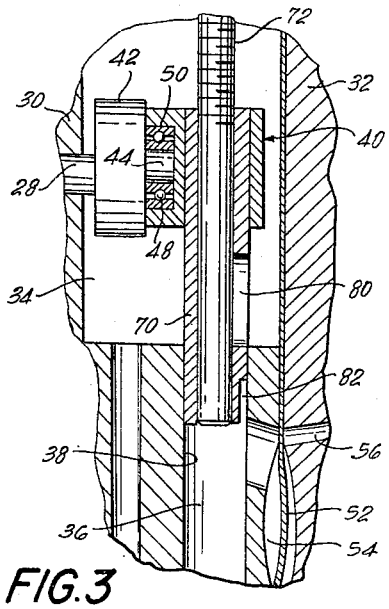
FIG. 3 is a fragmentary section similar to FIG. 2 but with the piston in an intermediate position on its down stroke.
Figure 4:
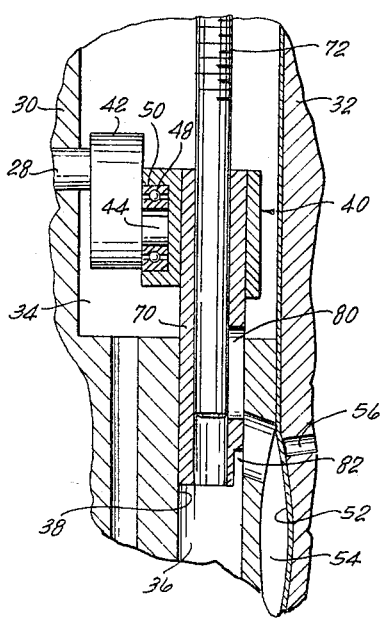
FIG. 4 is a fragmentary section similar to FIG. 2 but with the piston at the bottom of its down stroke.
Figure 5:
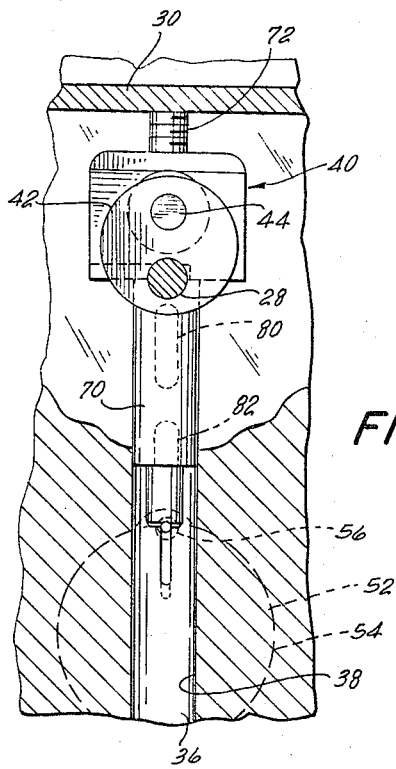
FIG. 5 is a vertical transverse cross-section taken along the line 5—5 of FIG. 2.

In the drawings, a hydraulically actuated positive displacement diaphragm metering pump 20 incorporating the teachings of this invention is shown and may be provided with a cabinet 22 operable to suitably mount and position the pump parts. Thus, a motor assembly 24 is mounted within the cabinet 22 and has associated therewith a gear reduction system 26 of conventional type having extending therefrom an output drive shaft 28. A pump body 30 is also supported by the cabinet 22 and which, in turn, has a face plate 32 suitably bolted thereto. An internal pump liquid reservoir 34 is thusly provided together with a pump chamber 36 and interposed cylinder 38.

A piston assembly 40 is reciprocal in the cylinder 38. This piston assembly 40 is drivably connected with the output shaft 28 by means of a Scotch yoke arrangement 42. This arrangement 42 includes a roll pin 44 extending from a crank arm 46 which, in turn, is keyed with the output shaft 28. The roll pin 44 supports a bearing 48 which, in turn, is adapted to travel in a slot or race 50 defined by surfaces of the piston assembly 40. The pumping function is induced mechanically when the output of the drive shaft 28 causes the drive bearing 48 to travel in a circular path which is converted through the Scotch yoke arrangement into straight line reciprocation of the piston assembly 40.

The reciprocation of the piston assembly 40 results in pulsation of a diaphragm 52 extending across chamber 54. The rear face of the diaphragm 52 communicates with the pump chamber 36 whereas the front face of the diaphragm is adapted to communicate with the liquid or solution to be pumped. This particlular liquid is exposed to the front face of the diaphragm 52 through the interconnected passageway 56.

In accordance with a successful commercial embodiment of the present invention, a chemical solution is strained through a filter stone 58 and enters the pumping head through a flexible tubing 60 and the suction valve assembly 62 located on the intake side of the pumping head. Reciprocation of the piston assembly 40 and, specifically, retraction thereof withdraws the solution to be pumped into the pumping head through the valve assembly 62. Since the piston pump delivers a precise amount of pump liquid or oil to the back of the diaphragm 52, forward movement of the piston assembly 40 will flex the diaphragm 52 to expel an equal amount of chemical solution from the pumping head. This solution then travels through the discharge valve assembly 64, the tubing 66 and a spring loaded anti-siphon valve 68 to the desired location.

Reference is now made to the piston assembly 40, the construction and function of which contributes significantly to the attainment of many of the objectives and advantages of this invention. An essentially hollow tubular piston 70 extends downwardly from the Scotch yoke arrangement through the reservoir 34 into the cylinder 38. This piston 70 reciprocates in a fixed-length repetitive and so-called "major stroke" path. The stroke axis of the piston 70 is maintained externally by the cylinder 38 as well as by the outer surface of a stator or adjustment screw 72. This stator 72 is adjustable longitudinally along its axis; and this may be accomplished simply by turning the control screw extending upwardly from the stator 72 and outwardly of the cabinet 22. The exposed control screw 72 is associated with a flow indicator 74 of substantially clear plastic material bearing a scale which shows the amount of liquid being pumped as a percentage of the pump's maximum rated capacity. In this connection, the top line is an indication of no flow whereas the second line indicates 10% of maximum rated capacity and so on to the bottom line which indicates 100% capacity. This indicator 74 also prevents accidental change of the volume setting. A shield 76 covers the top of the indicator 74 and is pivotally mounted by means of a screw 78.

The piston 70 is provided with mechanical interruptions in its external surface which cooperates with internal surface interruptions in the pump-body-bore to provide a fixed effective stroke length which may be adjusted to less than the "major stroke" length. The piston 70 is also provided with internal surface interruptions which cooperate with the stator 72 to provide a controllably variable working stroke length. Thus, the piston is provided with opening 80 and a recessed sector 82 at its lower end for such purposes. It should be understood at this juncture that the opening 80 takes no part in the control of the piston stroke when the stator 72 is set for maximum effective displacement.

To understand the purpose and function of the piston surface interruptions, reference is now made to the operation of the pump 20. When the pump is prepared for operation, hydraulic fluid enters the diaphragm chamber 54 at the rear side of diaphragm 52 as well as the adjoining cylinder 38. Hydraulic fluid is also contained in the lower portion of compartbent 34 and displaces air in lower passages leading from this chamber to the safety relief valve assembly 84, which, incidentally, protects the pump and system from overload.

At the top of its major stroke, piston 70 through the cut out sector 82 at its lower end, momentarily causes all hydraulic fluid cavities to be connected without restriction and thus at a pressure level common to all. So also at the bottom of its major stroke, piston 70 briefly exposes all hydraulic fluid chambers to each other and thereby neutralizes all pressure differentials in the hydraulic pump system through the communication of the chambers 34 and 36 through opening 80.

In this connection, it will be seen that, as the piston 70 travels downwardly into the cylinder 38 it also travels downwardly with respect to stator 72. At a point of travel, determined by the vertical positioning of stator 72, opening 80 will cause all hydraulic fluid chambers of the pump to be exposed to each other. When all portions of the hydraulic fluid mass are contiguous, fluid is transferred from chamber to chamber by the passage of piston 70 in the cylinder but it will be understood that no appreciable work force is effected. However, during that portion of each downward or pressure stroke when piston 70, stator 72 and surfaces of the pump body 30 cooperate to isolate the cylinder chamber 38 and diaphragm chamber 54 from the other hydraulic fluid chambers, piston 70 displaces fluid from the pump chamber 36 into the diaphragm chamber 54 at the rear of diaphragm 52. This causes the diaphragm 52 to move away from the pump body 30 and, in so doing, performs the classical diaphragm displacement function. In a similar period during the up or suction stroke, piston 70 imposes a negative or sucking force on the hydraulic fluid causing the diaphragm 52 to deflect towards the pump body 30, thereby transferring fluid from the diaphragm chamber 54 into the pump chamber 36.

Air or gas bubbles that may be entrained in the hydraulic fluid are greatly expanded by the negative pressure of the suction stroke and in this expanded state rise quickly to the highest point in the fluid of the diaphragm chamber 54 rearwardly of the diaphragm 52 to cylinder 38. It will be recalled that at the top of the retraction stroke of the piston 70, the cut out sector 82 momentarily neutralizes all pressure differentials. Thus, after expanding the bubbles to cause them to rise rapidly, they will thereafter be reduced to original size by the pressure neutralization. The succeeding downstroke further compresses the bubbles until at the lower end of the stroke, piston 70 again causes pressure neutralization. The bubbles, now at the top of the chambers, expand when neutralized into the surface interruption of opening 80; and they are thereafter carried out of the cylinder 38 during the succeeding suction stroke.

As previously explained, hydraulic drift will cause a diaphragm to gradually seek one extereme or the other in a hydraulically actuated diaphragm pump. With respect to the present pump of this invention, when the diaphragm 52 drifts so that it contacts the pump body 30 before the suction stroke is completed, vaporization of the hydraulic fluid permits completion of the stroke as is the case in other hydraulically actuated diaphragm pumps. However, unlike these other pumps, the pressure neutralization portion of the suction stroke causes the vapors to reliquify in the main and causes any vapor residue to be ejected during the succeeding pumping cycle.

When the diaphragm 52 drifts away from the pump body 30, so that it contacts the surface of face plate 32 before the pressure stroke has been completed, the sudden pressure built up in the cylinder 38 and particularly the pumping chamber 36 is by-passed through the relief valve assembly 84 back to the chamber 34.

Thus, it will be evident from the above that the pump 20 of this invention does compensate automatically for hydraulic drift in either direction and does so with a high degree of predictable accuracy while continuously purging the system of entrained gases and providing overload safety facility.

Those skilled in the art will appreciate that a hydraulically actuated diaphragm is provided having extreme accuracy, extended life and assured product purity. The pump is protected from damaging effects of accidental overload through the incorporation of an effective internal hydraulic relief valve. The safety adjust mechanism for locating the stator insures against accidental change of flow rate setting. Only a screw driver, deliberately applied, can change the setting of flow rate. By means of the present invention, poppet valves, constant velocity, resilient seat type may be employed for most dependable operation. Oil bath operation of working parts serve to minimize their wear. There is essentially complete chemical isolation, no chemical leakage, and no packing glands or moving shaft seals in the chemical stream. A rather significant contribution to the art resides in the self-purging hydraulic system that cannot airlock, never needs bleeding or packing.

Thus, among others, the several aforenoted objects and advantages are most effectively attained. Although a single somewhat preferred embodiment of this invention has been disclosed and described in detail herein, it should be understood that this invention is in no sense limited thereby and its scope is to be taken by that of the appended claims.

I claim:

1. A hydraulically actuated diaphragm pump comprising: a pump housing including a diaphragm chamber, an interconected piston cylinder chamber and a pump liquid reservoir adapted to be connected with both of the chambers, a pumping head coupled with the diphragm chamber, a flexible diaphragm extended across the diaphragm chamber and adapted to be flexed in a pumping direction to pump a solution from the pumping head and in a suction direction to such the solution into the pumping head, a piston assembly extending into the pump liquid reservoir reciprocally mounted in the piston cylinder and adapted to be reciprocated in a forward direction into the cylinder to flex the diaphragm in its pumping direction and in a retracted direction to flex the diaphragm in its suction direction through interposed pump liquid, said piston assembly comprising a stator adjustment means and a piston cooperating with the stator, the piston assembly having surface interruption means operable upon reciprocation of the piston assembly to interconnect the chambers and reservoir with one another, and drive means for reciprocating the piston assembly.

2. The invention in accordance with claim 1 wherein a suction line for the solution is connected with the pump head carrying solution into the head and a discharge line connected with the head to carry solution away from the pump head.

3. The invention in accordance with claim 2 wherein the suction line includes a tube connected at one end to the pump head, a suction valve assembly interposed between the tube and the pressure head and is adapted to be open when the diaphragm flexes in its suction direction and closed when the diaphragm flexes to its pumping direction, and a filter stone at the other end of the tube.

4. The invention in accordance with claim 2 wherein the discharge line includes a tube connected at one end to the pump head, a discharge valve assembly interposed between the tube and the pressure head and is adapted to be opened when the diaphragm is flexed in its pump direction and closed when the diaphragm is flexed in its suction direction, and an injection fitting and check valve assembly at the other end of the tube.

5. The invention in accordance with claim 1 wherein the diaphragm is formed of polytetrafluoroethylene.

6. The invention in accordance with claim 1 wherein the piston assembly is so constructed and arranged to cooperate in providing means to eliminate vapor lock by automatically purging liquid entrained gases each half cycle of reciprocation of the piston assembly.

7. The invention in accordance with claim 1 wherein the piston assembly is so constructed and arranged to cooperate in providing means in balancing hydraulic drift of the diaphragm.

8. A hydraulically actuated diaphragm pump comprising: a pump housing including a diaphragm chamber, an interconnected piston cylinder chamber and a pump liquid reservoir adapted to be connected with both of the chambers, a pumping head coupled with the diaphragm chamber, a diaphragm extended across the diaphragm chamber and adapted to be flexed in a pumping direction to pump a solution from the pumping head and in a suction direction to suck the solution into the pumping head, a piston assembly reciprocally mounted in the piston cylinder and adapted to be reciprocated in a forward direction into the cylinder to flex the diaphragm in its pumping direction and in a retracted direction to flex the diaphragm in its suction direction through interposed pump liquid, said piston assembly comprising a stator and a piston telescopically associated with the stator, the piston assembly having surface interruption means operable upon reciprocation of the piston assembly to interconnect the chambers and reservoir with one another, the stator being coaxially mounted within the cylinder and being comprised of an elongated rod, adjustment means for adjusting the extent of penetration of the rod into said cylinder for controllably varying the effective working stroke length of the piston, and drive means for reciprocating the piston assembly.

9. The invention in accordance with claim 8 wherein the adjustment means is exteriorly mounted on the pump housing, a flow indicator coupled with the adjustment means to protect the setting thereof and indicate the amount of solution being pumped as a percentage of the pump's maximum rated capacity.

10. The invention in accordance with claim 8 wherein the piston is hollow and the stator is a stationary rod and is disposed within the piston, the piston having a fixed-length repetitive major stroke path, said piston surface interruption means cooperating with surfaces of the pump housing to provide a fixed effective piston stroke length adapted to be a percentage of the major stroke length.

11. The invention in accordance with claim 10 wherein the surface interruption means comprises a cut out sector at the forward end of the piston and an opening intermediate the ends of the piston.

12. A hydraulically actuated diaphragm pump comprising: a pump housing including a diaphragm chamber, an interconnected piston cylinder chamber and a pump liquid reservoir adapted to be connected with both of the chambers, a pumping head coupled with the diaphragm chamber, a diaphragm extended across the diaphragm chamber and adapted to be flexed in a pumping direction to pump a solution from the pumping head and in a suction direction to suck the solution into the pumping head, a piston assembly reciprocally mounted in the piston cylinder and adapted to be reciprocated in a forward direction into the cylinder to flex the diaphragm in its pumping direction and in a retracted direction to flex the diaphragm in its suction direction through interposed pump liquid, said piston assembly comprising a stator and a piston telescopically associated with the stator, the piston assembly having surface interruption means operable upon reciprocation of the piston assembly to interconnect the chambers and reservoir with one another, the piston being hollow and the stator being a stationary rod and being disposed within the piston, the piston having a fixed-length repetitive major stroke path, said piston surface interruption means cooperating with surfaces of the pump housing to provide a fixed effective piston stroke length adapted to be a percentage of the major stroke path, and drive means for reciprocating the piston assembly.

13. The invention in accordance with claim 12 wherein the surface interruption means comprises a cut out sector at the forward end of the piston and an opening intermediate the ends of the piston.

14. The invention in accordance with claim 1 wherein a relief valve assembly is coupled with both the reservoir and piston cylinder and is adapted to open and communicate the cylinder with the reservoir upon overload of the pump.

15. The invention in accordance with claim 1 wherein the drive means comprises a motor drive having an output shaft, and a Scotch yoke arrangement interconnecting the output shaft with the piston whereupon rotation of the shaft is converted through the Scotch yoke arrangement into straight line reciprocation of the piston.

16. A hydraulically actuated diaphragm pump comprising: a pump housing including a diaphragm chamber, an interconnected piston cylinder chamber and a pump liquid reservoir adapted to be connected with both of the chambers, a pumping head coupled with the diaphragm chamber, a diaphragm extended across the diaphragm chamber and adapted to be flexed in a pumping direction to pump a solution from the pumping head and in a suction direction to suck the solution into the pumping head, a piston assembly reciprocally mounted in the piston cylinder and adapted to be reciprocated in a forward direction into the cylinder to flex the diaphragm in its pumping direction and in a retracted direction to flex the diaphragm in its suction direction through interposed pump liquid, said pump including automatic hydraulic drift balancing means including cooperating means between said piston cylinder and reservoir whereupon hydraulic drift of the diaphragm is automatically balanced, said balancing means also comprising only one relief valve assembly coupled with both the reservoir and piston cylinder chamber for opening and communicating the cylinder with the reservoir upon overload of the pump.

17. A pump comprising a pump housing having a piston cylinder therein and a reservoir for pump liquid adapted to be connected with the piston cylinder, a piston assembly reciprocally mounted in the piston cylinder and adapted to be reciprocated in a forward direction to compress pump liquid in the cylinder and in a retracted direction with respect to the cylinder, and automatic self-purging means defined by surfaces of said piston assembly and cylinder for eliminating vapor lock by automatically purging liquid entrained gases from the pump cylinder at least once during each reciprocation cycle of the piston.

18. The invention in accordance with claim 17 wherein said self-purging means operates to purge liquid entrained gases each half cycle of reciprocation of the piston assembly.

19. The invention in accordance with claim 17 wherein the stator is coaxially mounted within the cylinder and is comprised of an elongated rod, adjustment means for adjusting the exent of penetration of the rod into said cylinder for controllably varying the effective working stroke length of the piston.

20. The invention in accordance with claim 19 wherein the adjustment means is exteriorly mounted on the pump housing, a flow indicator coupled with the adjustment means to protect the setting thereof and indicate the amount of solution being pumped as a percentage of the pumps maximum rated capacity.

21. The invention in accordance with claim 19 wherein the piston is hollow and the stator is a stationary rod and is disposed within the piston, the piston having a fixed-length repetitive major stroke path, said piston surface interruption means cooperating with surfaces of the pump housing to provide a fixed effective piston stroke length adapted to be a percentage of the major stroke length.

22. The invention in accordance with claim 21 wherein the surface interruption means comprises a cut out sector at the forward end of the piston and an opening intermediate the ends of the piston.

23. The invention in accordance with claim 17 wherein the piston is hollow and the stator is a stationary rod and is disposed within the piston, the piston having a fixed-length repetitive major stroke path, said piston surface interruption means cooperating with surfaces of the pump housing to provide a fixed effective piston stroke length adapted to be a percentage of the major stroke length.

24. The invention in accordance with claim 23 wherein the surface interruption means comprises a cut out sector at the forward end of the piston and an opening intermediate the ends of the piston.

References Cited by the Examiner

UNITED STATES PATENTS

| | | | |
|---|---|---|---|
| 2,303,597 | 12/1942 | Adelson | 103—44 |
| 2,578,746 | 12/1951 | Scherger et al. | 103—44 |
| 2,691,943 | 10/1954 | Wilson | 103—44 |
| 2,871,789 | 2/1959 | Kiffer et al. | 103—44 |
| 3,000,320 | 9/1961 | Ring | 103—44 |

ROBERT M. WALKER, *Primary Examiner.*